US012359489B2

(12) United States Patent
Grimm

(10) Patent No.: US 12,359,489 B2
(45) Date of Patent: Jul. 15, 2025

(54) FURNITURE DRIVE SYSTEM FOR A MOVABLE FURNITURE PART

(71) Applicant: Julius Blum GmbH, Hoechst (AT)

(72) Inventor: Matthias Grimm, Altach (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/381,346

(22) Filed: Oct. 18, 2023

(65) Prior Publication Data

US 2024/0044196 A1 Feb. 8, 2024

Related U.S. Application Data

(63) Continuation of application No. PCT/AT2022/060149, filed on Apr. 29, 2022.

(30) Foreign Application Priority Data

Apr. 30, 2021 (AT) .............................. A 50338/2021

(51) Int. Cl.
*E05F 15/63* (2015.01)
*E05F 1/12* (2006.01)
*E05F 5/10* (2006.01)

(52) U.S. Cl.
CPC ............ *E05F 15/63* (2015.01); *E05F 1/1261* (2013.01); *E05F 5/10* (2013.01); *E05Y 2900/20* (2013.01)

(58) Field of Classification Search
CPC ....... E05F 15/63; E05F 15/605; E05F 1/1058; E05F 1/1261; E05F 3/04; E05F 5/10; E05Y 2900/20
See application file for complete search history.

(56) References Cited

U.S. PATENT DOCUMENTS 8,056,991 B2 * 11/2011 Hollenstein ........... E05F 1/1058 312/319.5
8,807,670 B2 8/2014 Blum
(Continued)

FOREIGN PATENT DOCUMENTS

AT 12 191 12/2011
AT 519935 11/2018
(Continued)

OTHER PUBLICATIONS

International Search Report issued Aug. 5, 2022 in International (PCT) Application No. PCT/AT2022/060149.

*Primary Examiner* — Justin B Rephann
(74) *Attorney, Agent, or Firm* — Wenderoth, Lind & Ponack, L.L.P.

(57) ABSTRACT

A furniture drive system includes: a support for mounting the system on a furniture carcass; an actuating arm device movably mounted on the support and to be connected to the movable furniture part; an electric motor to be connected to the actuating arm device to move sections of the actuating arm device; a drive device separate from the electric motor for exerting a force on the actuating arm device; an adjusting device for adjusting the force to be exerted by the drive device; and a control device for controlling the electric motor. The control device has a determining device for determining the force to be exerted on the actuating arm device, and the drive device has a damping device to dampen a closing movement and/or an opening movement of the actuating arm device. The determining device is designed to perform a damper analysis of the damping device.

34 Claims, 16 Drawing Sheets

(56) References Cited

U.S. PATENT DOCUMENTS

| | | | |
|---|---|---|---|
| 9,277,817 B2 | 3/2016 | Blum | |
| 10,590,692 B2 | 3/2020 | Bohle | |
| 10,988,966 B2 | 4/2021 | Haemmerle et al. | |
| 2010/0026153 A1* | 2/2010 | Mattle | E05D 15/46 310/83 |
| 2010/0043595 A1* | 2/2010 | Mattle | A47B 88/457 74/625 |
| 2010/0327717 A1* | 12/2010 | Huber | F16H 19/001 310/83 |
| 2011/0062842 A1* | 3/2011 | Huber | E05F 15/63 310/83 |
| 2011/0138960 A1* | 6/2011 | Omann | E05C 19/165 74/490.07 |
| 2012/0032570 A1* | 2/2012 | Friesenecker | E05F 15/63 312/319.6 |
| 2012/0056521 A1* | 3/2012 | Friesenecker | E05F 15/63 310/80 |
| 2012/0161598 A1 | 6/2012 | Blum | |
| 2014/0319987 A1 | 10/2014 | Blum | |
| 2016/0010379 A1* | 1/2016 | Sauerwein | E05F 15/70 49/350 |
| 2016/0333620 A1* | 11/2016 | Holzapfel | E05F 1/1058 |
| 2018/0209195 A1 | 7/2018 | Battlogg et al. | |
| 2019/0010747 A1 | 1/2019 | Bohle | |
| 2020/0063484 A1 | 2/2020 | Haemmerle et al. | |

FOREIGN PATENT DOCUMENTS

| | | |
|---|---|---|
| DE | 20 2010 005 934 | 9/2010 |
| EP | 2 949 852 | 12/2015 |
| EP | 3 443 191 | 1/2020 |
| JP | 2020-519794 | 7/2020 |
| WO | 2011/020130 | 2/2011 |
| WO | 2012/155165 | 11/2012 |

* cited by examiner 6
7
A

D

D

FURNITURE DRIVE SYSTEM FOR A MOVABLE FURNITURE PART

BACKGROUND OF THE INVENTION

The present invention relates to a furniture drive system for a movable furniture part with a support for fitting the furniture drive system on a furniture carcass, an actuating arm device, which is movably, preferably rotatably, mounted on the support and which can be connected to the movable furniture part, an electric motor, which is connected or can be connected to the actuating arm device and which can be used to move the actuating arm device at least in portions, at least one drive device, which is separate from the electric motor and with which a force can be exerted on the actuating arm device, a setting device, with which the force that can be exerted on the actuating arm device by the at least one drive device can be set and a control device, with which the electric motor can be controlled. In addition, the invention relates to a piece of furniture with such a furniture drive system. Furthermore, the invention relates to a method for operating such a furniture drive system.

Furniture drive systems with actuating arm devices have been used for many decades to move furniture flaps which are rotatable or pivotable about a horizontal axis or are displaceable along a vertical plane. Examples of such furniture fittings follow from WO 2012/155165 A2 and WO 2011/020130 A1.

In addition, furniture drive systems are known in which these systems contain two assemblies that are separate from each other, namely a mechanical actuating unit (comprising the drive device) and an electric drive unit. Examples of this follow from EP 3 443 191 B1 and AT 519 935 A1.

In the case of such furniture drive systems it is important that the same systems can be used equally in the case of movable furniture parts of different sizes and weights. For this, individual parameters (e.g. force) of the drive device and/or of the electric motor can be set via the setting devices. In the case of the earlier furniture drive systems it can come about that the effect emanating from the drive device is not compatible with the driven movable furniture part. In some cases this can result in damage to the movable furniture part or even in accidents with a person actuating the movable furniture part.

Further furniture drive systems are already known from the documents AT 12191 U1 and EP 2 949 852 A1.

SUMMARY OF THE INVENTION

The object of the present invention is therefore to create a furniture drive system that is improved compared with the state of the art and an improved method. In particular, the setting is to be made easier and errors during the setting are to be prevented.

According to the invention, a control device has a determining device for determining the force that can be or is exerted on the actuating arm device by the at least one drive device and the at least one drive device has a damping device with which a closing movement and/or an opening movement of the actuating arm device can be damped, wherein the determining device is formed to carry out a damper check of the damping device.

Thus, the fitter (or an operator) is no longer on their own and having to make the correct settings in the drive device, but rather the furniture drive system itself assists the fitter (or the operator) by detecting the force acting on the actuating arm device—and thus on the movable furniture part in the installed state. It can thereby be easily recognized whether the settings of the fitted furniture drive system are compatible with the furniture part to be moved.

The drive device can have several components or component parts which apply force to the actuating arm device.

It is preferable that the at least one drive device has an energy storage mechanism, preferably in the form of a spring assembly, which on one side engages on the support and on the other side engages, preferably indirectly, on the actuating arm device. This spring assembly particularly preferably has two separate compression springs.

It is preferable that the energy storage mechanism is formed in order to compensate for a weight force of the actuating arm device and of the furniture part that can be connected to the actuating arm device and/or in order to move the actuating arm device in the direction of a fully closed position and/or in order to move the actuating arm device in the direction of a fully open position. Thus, the movable furniture part can be opened as far as a certain angular position, in which the movable furniture part then remains in a state balanced by the actuating arm device and the energy storage mechanism.

In addition to the energy storage mechanism, the at least one drive device has a damping device, with which a closing movement and/or an opening movement of the actuating arm device can be damped. A smooth closing and opening, above all reaching the respective end position softly, is thus made possible.

In general, it is preferable that the actuating arm device is movable between a first maximum position, which corresponds to the closed position between movable furniture part and furniture carcass, and a second maximum position, which corresponds to the maximum open position of the movable furniture part relative to the furniture carcass.

In principle, it is possible that the damping device damps the entire movement path of the actuating arm device. However, it is preferably provided that the damping via the damping device is effected in a portion of the movement of the movable furniture part upstream of the closed position and the maximum open position.

The (respectively) upstream movement portion can correspond to a pivoting angle range of the actuating arm device (and thus indirectly of the movable furniture part) of between 2° and 25°, preferably between 5° and 15°.

As already mentioned, the drive device has two component parts for which the determining device can be used: on the one hand an energy storage mechanism check can be carried out for the energy storage mechanism and on the other hand a damper check can be carried out for the damping device. It is possible that only one of these two checks is carried out via the determining device. It is preferable that both checks are carried out via the determining device. If both checks are carried out, it is advantageous if first the energy storage mechanism check and then the damper check is carried out.

With respect to the two specifically possible and preferred determinations or checks, the following, in some cases corresponding, preferred embodiments are provided.

With regard to the energy storage mechanism, it is preferable that the determining device has a sensor for measuring the power consumption of the electric motor. Specifically, a resistance sensor can be used. An energy balance of the electric motor can also be detected.

Furthermore, it is preferable that, by means of the control device, the power consumption of the electric motor measured via the sensor can be compared with a reference value or reference value progression of the power consumption, preferably determined and/or recorded in a reference movement. In the case of a deviation of the measured power consumption from the reference value or from the reference value progression which preferably lies above a defined threshold value, a deviation signal can be emitted.

The reference value can, for example, also be an energy balance. The threshold value can be a percentage value, for example a maximum 5 percent deviation can be recorded as threshold value.

The deviation signal can be emitted acoustically. It is preferable that, via the control device, a visual indication signal can be displayed on the furniture drive system, preferably on a cover, depending on the emitted deviation signal. For example, a red LED light can light up as indication signal in a corresponding display panel.

Not only is the emission of a deviation signal important but also the consequence resulting therefrom: it can specifically be provided that, when a deviation signal is emitted, the force from the energy storage mechanism acting on the actuating arm device can be set via an energy storage mechanism setting unit of the setting device.

For example, the energy storage mechanism setting unit can comprise a rotatable setting wheel, wherein the point of application of the energy storage mechanism along a threaded spindle can be set through a rotation of a setting wheel and the torque acting on the actuating arm can thus be set.

With regard to the damping device, it is preferable that the determining device has an angle sensor for measuring the angular position of the actuating arm device.

Furthermore, it is preferable that, by means of the control device, a speed of the actuating arm device in a movement portion directly upstream of the closed position and/or the open position can be determined from the values measured by the angle sensor at different points in time.

According to a preferred embodiment, by means of the control device, the speed determined via the angle sensor can be compared with a reference value or reference value progression of the speed, preferably recorded and/or determined in a reference movement. In the case of a deviation of the measured speed from the reference value or from the reference value progression which preferably lies above a defined threshold value, a deviation signal can be emitted.

In order to prevent the speed determination from being influenced by the energy storage mechanism of the drive device, it is preferable that during this determination the electric motor is decoupled or can be disconnected from the actuating arm device, preferably by a freewheel clutch.

During the damper check, it is also preferable that, via the control device, a visual indication signal can be displayed on the furniture drive system, preferably on a cover, depending on the emitted deviation signal.

Not only is the emission of a deviation signal important, but also the consequence resulting therefrom: when a deviation signal is emitted, the damping force, the damping starting position in relation to an angular position of the actuating arm device relative to the support and/or with regard to a damping path can be set via a damper setting unit of the setting device.

For example, with the damper setting unit, the relative position between a damper housing and the support can be set, preferably by switching a toollessly actuatable setting means in the form of a switch between two positions.

In general, the actuating arm device and the at least one drive device can be part of a mechanical actuating unit, and the electric motor can be part of an electric drive unit which is implemented as an assembly formed separately from the mechanical actuating unit and which has a driver, which can be driven by the at least one electric motor, for transmitting a torque of the electric motor to the actuating arm device of the mechanical actuating unit.

For a transmission and conversion of movement, the electric drive unit has a gear mechanism between the electric motor and the driver.

With respect to this gear mechanism, preferably it comprises at least two gear stages, a freewheel clutch and/or an overload clutch. A transmission and conversion of movement is also advantageous in the region of the mechanical actuating unit, wherein a transmission mechanism is preferably provided, with which the force of the energy storage mechanism can be transmitted to the actuating arm device.

In order to enable a pulling-to and opening movement of the actuating arm device, preferably the transmission mechanism has a control cam and a pressure roller loaded by the energy storage mechanism, wherein the pressure roller can be moved along the control cam during a movement of the at least one actuating arm.

Furthermore, preferably the actuating arm device has a movably mounted actuator for the transmission of a force from the energy storage mechanism to the actuating arm.

In order to connect or to link the mechanical actuating unit to the electric drive unit, preferably the actuator has a transmission opening, in which the driver that is drivable by the electric motor engages or can engage.

Protection is also sought for a piece of furniture with a furniture carcass, at least one furniture part that is movable, in particular about a horizontal axis, in particular in the form of a bi-fold lift flap, lift up flap or up and over lift flap, and a furniture drive system according to the invention.

The above-mentioned object is also achieved by achieving the step of determining the force that can be exerted or is exerted on the actuating arm device by the at least one drive device by a determining device of the control device, wherein the determining device carries out a damper check of the damping device.

For the energy storage mechanism check, the following steps are preferable:

- measuring the power consumption of the electric motor via a sensor,
- comparing the measured power consumption with a reference value or reference value progression, preferably determined and/or recorded in a reference movement, and
- emitting a deviation signal in the case of a deviation of the measured power consumption from the reference value or from the reference value progression which preferably lies above a defined threshold value.

In addition, the step of setting or adjusting the force from an energy storage mechanism of the drive device acting on the actuating arm device is preferably provided via an energy storage mechanism setting unit of the setting device when a deviation signal is emitted.

For the damper check (preferably to be carried out after the energy storage mechanism check), the following steps are preferable:

- determining a speed of the actuating arm device in a movement portion directly upstream of the closed position and/or the open position based on values measured by an angle sensor at different points in time,
- comparing the speed determined via the angle sensor with a reference value or reference value progression, preferably recorded and/or determined in a reference movement, and emitting a deviation signal in the case of a deviation of the measured speed from the reference value or from the reference value progression which preferably lies above a defined threshold value.

Finally, the step of setting or adjusting the damping force, the damping starting position in relation to an angular position of the actuating arm device relative to the support and/or a damping path of a damping device of the drive device is also preferably provided via a damper setting unit of the setting device when a deviation signal is emitted.

In different words in some cases, the present invention can also be described as follows:

The energy storage mechanism check is effected over reference movements in the form of an opening and closing movement. In a particular angular range—which lies for instance in an intermediate region between the closed position and the fully open position (preferably an angular range of between 20° and 90° between the end positions)—the motor current is measured via a corresponding resistance sensor. If the values lie within a certain (balanced) range (threshold value) during opening and closing, the energy storage mechanism setting is correct, and no deviation signal is emitted. A possible deviation is displayed via a display on the cover.

The damper check is also effected over at least one reference movement. For this—once the energy storage mechanism check has been successfully completed in order not to have any subsequent errors—in an end region of the opening and/or closing movement (in which the energy storage mechanism is decoupled from the actuating arm in order not to work against the damper), the angular position is detected via a magnetic angle sensor and compared with a reference time. If there is a deviation from a target value here, the damper must be set to be stronger or weaker. This is also correspondingly displayed via a display on the cover.

As a third variant, the determining device can also be used as follows: a checking of the rebounding movement can be effected in the case of (vigorous) closing or opening. For this, the oscillating angular position is detected during the rebounding movement and correspondingly compared with a reference value. Here too, corresponding settings can then be altered when a rebound error signal is emitted.

BRIEF DESCRIPTION OF THE DRAWINGS

Further details and advantages of the present invention are explained in more detail below with reference to the drawings, in which.

DETAILED DESCRIPTION OF THE INVENTION

Figure 1:
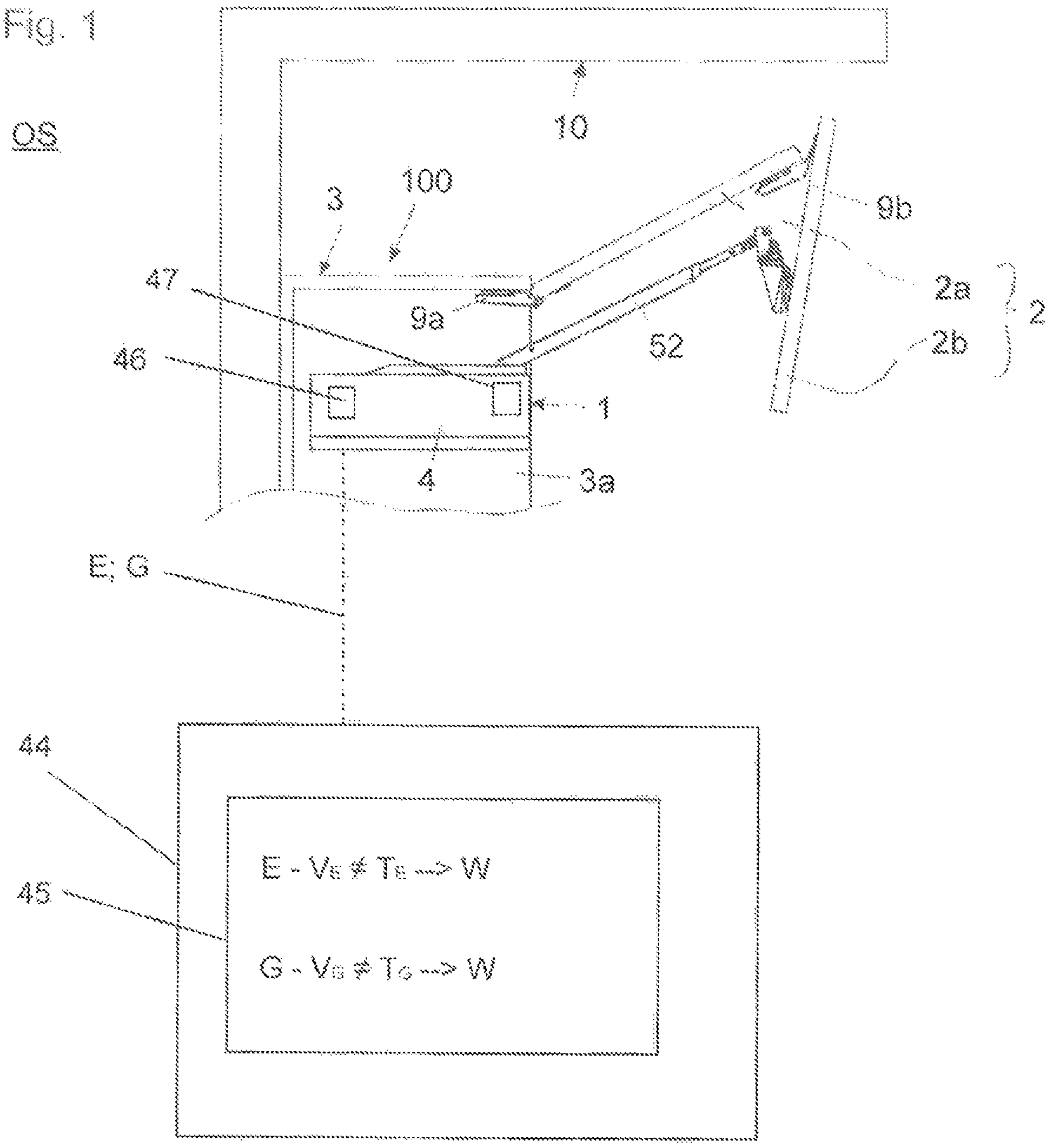
FIG. 1, schematically shows a piece of furniture with a furniture drive system for a furniture flap.

FIG. 1 shows a piece of furniture 100 with a furniture carcass 3, wherein a furniture drive system 1 (furniture fitting) for moving a movably mounted furniture part 2 is fastened to a side wall 3*a* of the furniture carcass 3.

In the embodiment shown, the movable furniture part 2 has two furniture flaps 2*a*, 2*b*, wherein a first furniture flap 2*a* is connected, pivotable about a horizontally running axis of rotation, to the furniture carcass 3 via at least two hinges 9*a* and the second furniture flap 2*b* is connected, pivotable about a horizontally running axis of rotation, to the first furniture flap 2*a* via at least two hinges 9*b*.

The furniture drive system 1 has a support 4 to be fastened to the furniture carcass 3, preferably to the side wall 3*a* of the furniture carcass 3, and at least one actuating arm 52, which is pivotable relative to the support 4 and is connected to the movable furniture part 2, preferably to the second furniture flap 2*b*.

It can be recognized that the piece of furniture 100 is arranged spaced apart from the ceiling 10 in FIG. 1. In FIG. 1 the actuating arm 52 encloses a relatively large pivot angle, which corresponds to the maximum open position OS of the movable furniture part 2.

Figure 2A:
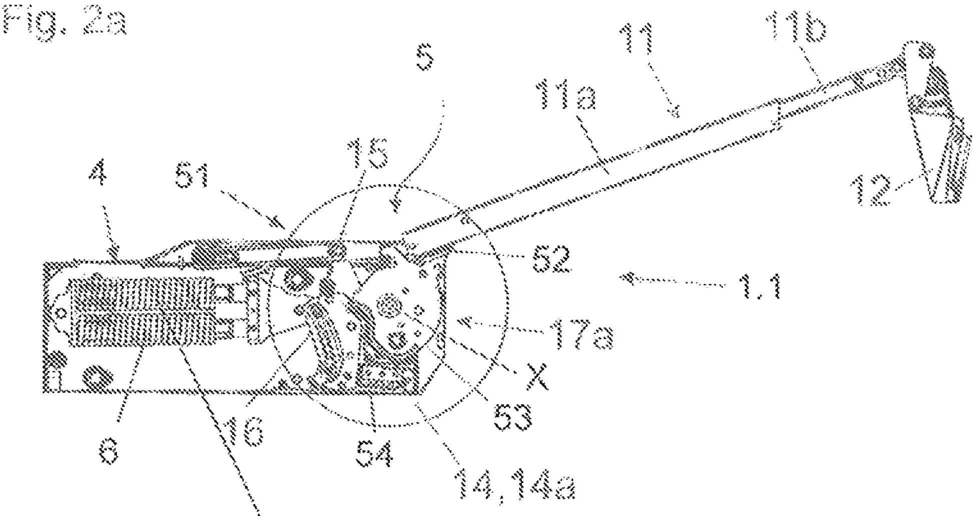
FIG. 2*a* is a view of a mechanical actuating unit with an actuating arm device and an energy storage mechanism.

FIG. 2*a* shows the mechanical actuating unit 1.1 of the furniture drive system 1 in a side view, wherein the mechanical actuating unit 1.1 has a support 4 to be fastened to the furniture carcass 3 and at least one actuating arm 52 which is mounted on the support 4, pivotable about a pivot pin X.

In the embodiment shown, an actuating arm extension 11 is releasably arranged on the actuating arm 52, wherein the actuating arm extension 11 has two actuating arm parts 11*a*, 11*b* that are displaceable relative to each other. It is preferably provided that the actuating arm parts 11*a*, 11*b* are telescopically displaceable relative to each other, wherein the first actuating arm part 11*a* can be releasably connected to the actuating arm 52. The second actuating arm part 11*b* has a fastening device 12, which can be releasably connected to a fitting part to be fastened to the movable furniture part 2, preferably can be locked and unlocked toollessly.

To apply force to the actuating arm 52 of the actuating arm device 5, an energy storage mechanism 6 is provided, which can have, for example, at least one helical spring, preferably at least one compression spring. Alternatively, the energy storage mechanism 6 can also have other energy storage mechanisms, such as for example a fluid storage mechanism in the form of a gas spring.

The actuating arm device 5 has a transmission mechanism 51 for transmitting a force of the energy storage mechanism 6 to the at least one actuating arm 52. It is preferably provided that the transmission mechanism 51 has a control cam 53 and a pressure roller 54 loaded by the energy storage mechanism 6, wherein the pressure roller 54 can be moved along the control cam 53 during a movement of the at least one actuating arm 52.

According to a preferred embodiment, the control cam 53 can be arranged or formed on the actuating arm 52. Of course, it is also possible to arrange the control cam 53 at a different place in the transmission mechanism 51 of the actuating arm device 5.

Figure 2B:
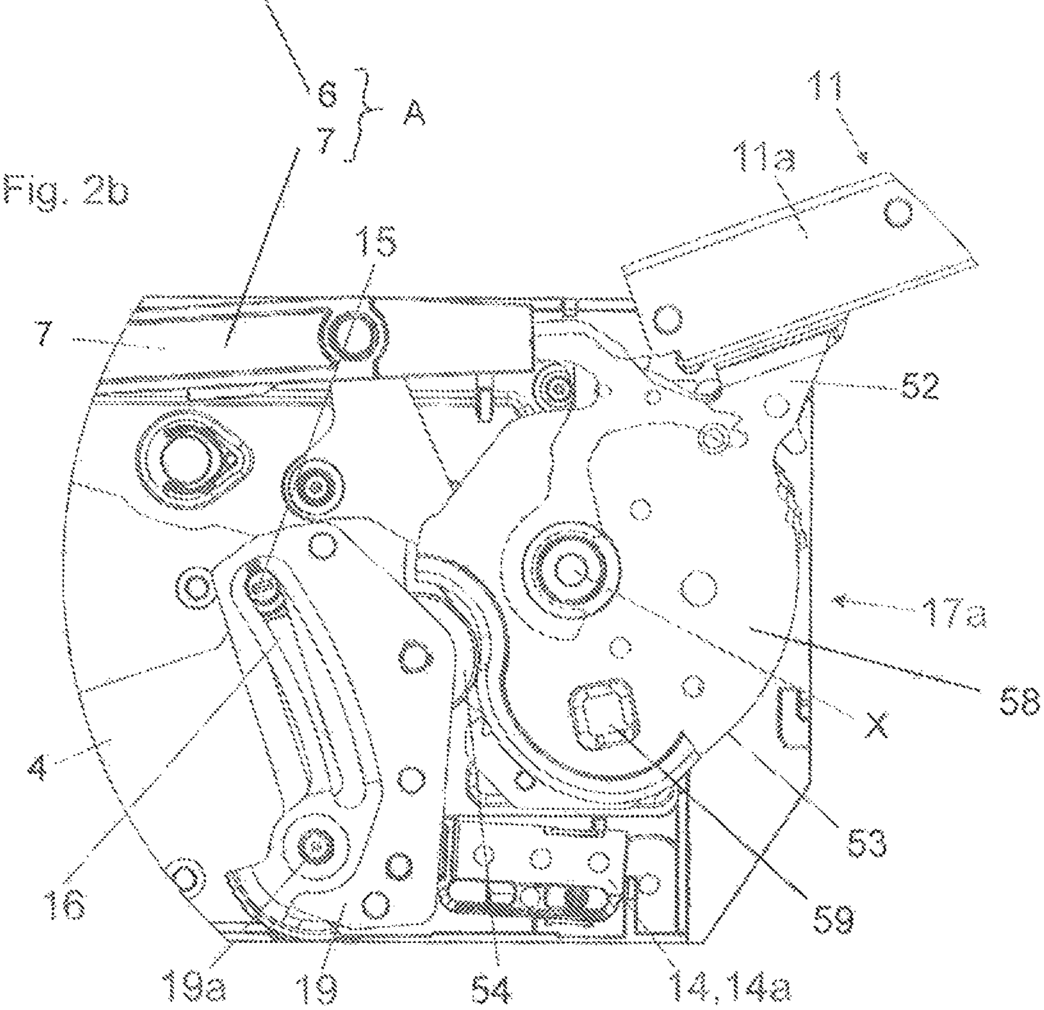
FIG. 2*b* shows a detail from FIG. 2*a*, FIGS. 3*a*+3*b* are perspective representations of the mechanical actuating unit, FIGS. 4*a*+4*b* are longitudinal sections through the mechanical actuating unit in an intermediate open position, FIGS. 5*a*+5*b* show details relating to FIGS. 4*a* and 4*b*, FIGS. 6*a*+6*b* are longitudinal sections through the mechanical actuating unit in a furniture part position upstream of the maximum open position, wherein in each case the damping starting position is given, FIGS. 7*a*+7*b* are longitudinal sections through the mechanical actuating unit in a furniture part position upstream of the closed position, wherein in each case the damping starting position is given.

In the case represented in FIG. 2*b* the actuating arm 52 is formed in one piece with an actuator 55 for the transmission of a force from the energy storage mechanism 6 to the actuating arm 52. The control cam 53 is formed on this actuator 55. In addition, the transmission opening 59, in which the driver 31 that is drivable by the electric motor 30 engages or can engage, is formed in this actuator 58.

A force of the energy storage mechanism 6 onto the at least one actuating arm 52 can be set by an energy storage mechanism setting unit 14. It is preferably provided that

- the energy storage mechanism setting unit 14 has at least one rotatably mounted setting wheel 14*a*, wherein a force of the energy storage mechanism 6 onto the actuating arm 52 acting on the at least one actuating arm 52 can be set by a rotation of the setting wheel 14*a*, and/or
- the energy storage mechanism setting unit 14 has at least one threaded spindle 16, along which a point of application 15 of the energy storage mechanism 6 is movable when the energy storage mechanism setting unit 14 is actuated and/or
- the support 4 has a front face with at least one opening 17*a*, through which the at least one actuating arm 52 protrudes in an open position, wherein a setting wheel 14*a* of the energy storage mechanism setting unit 14 can be actuated through the opening 17*a* from a direction transverse to the front face.

FIG. 2*b* shows the region circled in FIG. 2*a* in an enlarged view. The transmission mechanism 51 has an intermediate lever 19, which is mounted on the support 4, pivotable about a pivot pin 19*a*. The threaded spindle 16 is mounted on the intermediate lever 19. Through a rotation of the setting wheel 14*a* of the energy storage mechanism setting unit 14 by a tool, the threaded spindle 16 can be rotated, as a result of which the point of application 15 of the energy storage mechanism 6 moves along the threaded spindle 16. In this way, the relative distance between the point of application 15 and the pivot pin 19*a* of the intermediate lever 19, and thus the torque of the energy storage mechanism 6 acting on the actuating arm 52, can be increased and decreased.

The mechanical actuating unit 1.1 furthermore comprises at least one damping device 7 for damping a movement of the at least one actuating arm 52 of the actuating arm device 5. This damping device 7 forms, together with the energy storage mechanism 6, the drive device A, with which a force can be exerted on the actuating arm device 5.

It is preferably provided for the damping device 7 that it
- is formed as a fluid damper and/or
- has at least one piston-cylinder unit and/or
- can be acted on by the at least one actuating arm 52 during a closing movement and/or
- can be acted on from the same side both during an opening movement O and during a closing movement S of the at least one actuating arm 52.

Figure 3A:
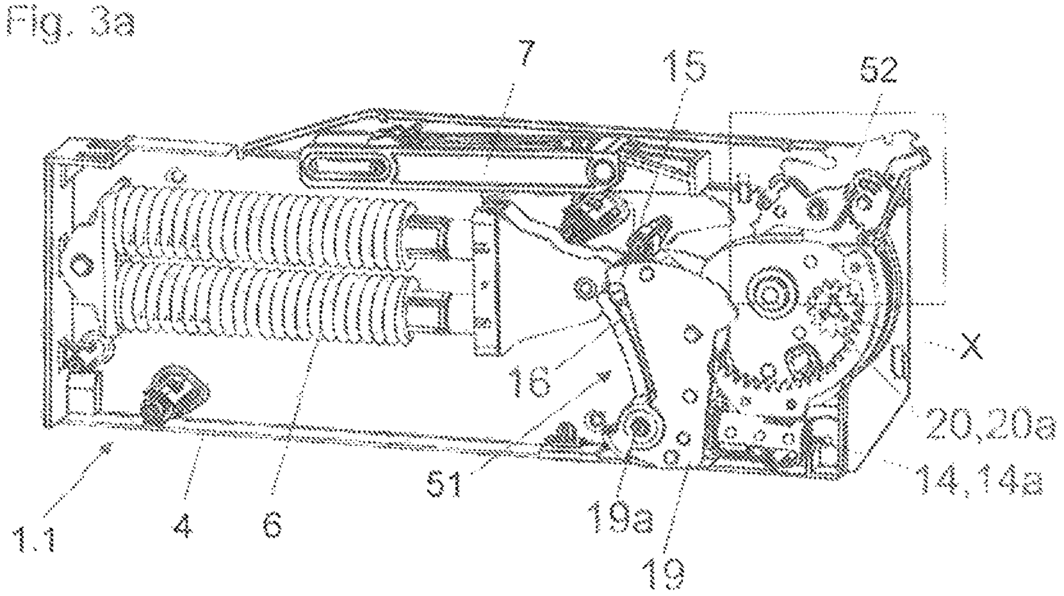

FIG. 3*a* shows the mechanical actuating unit 1.1 in a perspective view, wherein a force of the energy storage mechanism 6 can be transmitted to the at least one actuating arm 52 by the transmission mechanism 51 of the actuating arm device 5. The energy storage mechanism setting unit 14 can, for example, comprise a rotatable setting wheel 14*a*, wherein the point of application 15 of the energy storage mechanism 6 along the threaded spindle 16 can be set through a rotation of the setting wheel 14*a* and the torque acting on the actuating arm 52 can thus be set.

The mechanical actuating unit 1.1 can additionally have an installation safety device 20 for the empty actuating arm 52, thus on which a movable furniture part 2 has not yet been fitted, for limiting an opening speed of the empty actuating arm 52, wherein the installation safety device 20 prevents the empty actuating arm 52 from being unintentionally opened or swung out by a force of the energy storage mechanism 6. It is preferably provided that the installation safety device 20 comprises at least one centrifugal clutch 20*a*.

Figure 3B:
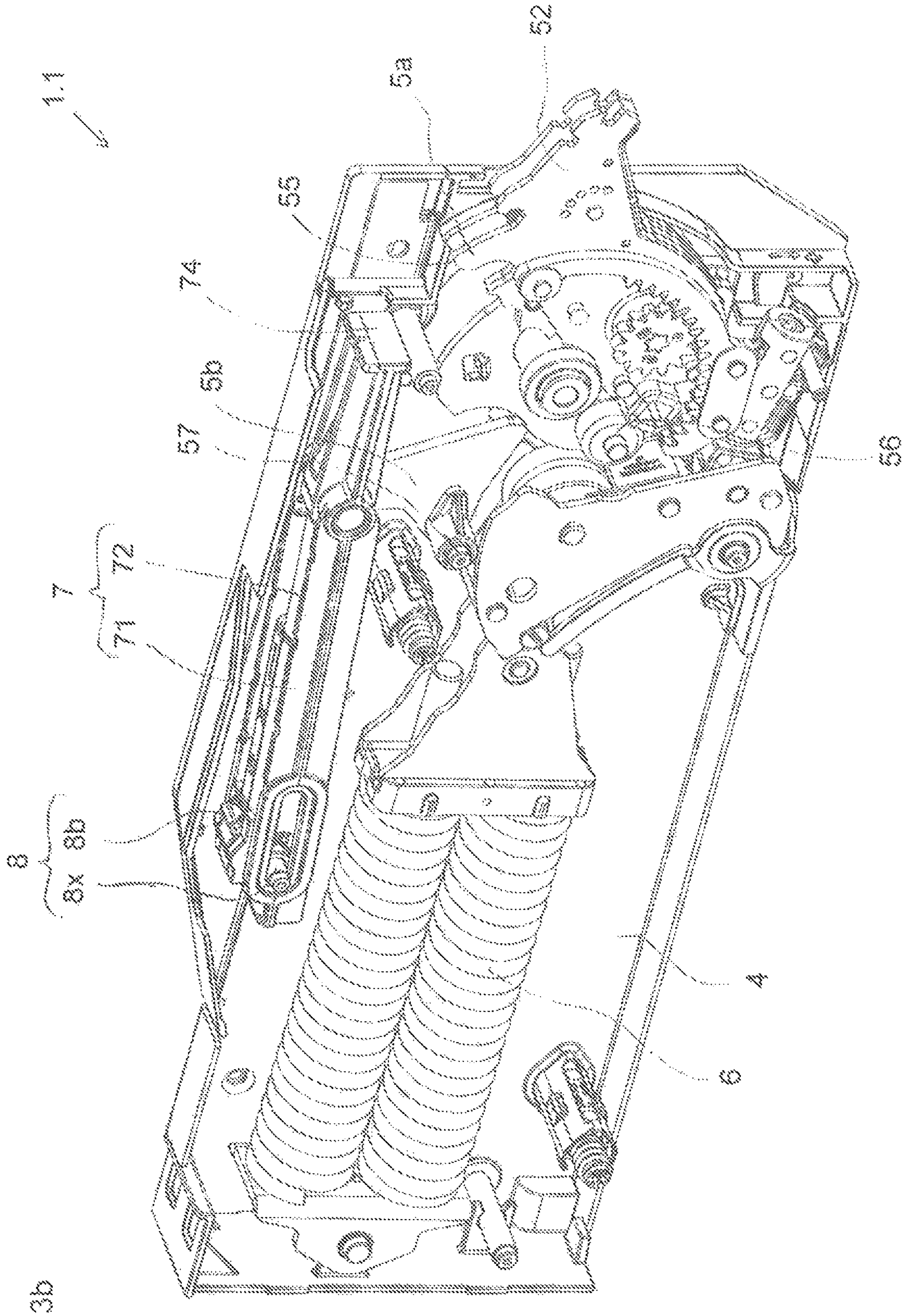

FIG. 3*b* shows the mechanical actuating unit 1.1 in a further (slightly offset) perspective view. The entire damping device 7 can be easily recognized in this representation. This damping device 7 contains the damper housing 71 and the damper piston 72.

The damping device 7 is adjustable relative to the support 4 via the damper setting unit 8. The damper setting unit 8 contains the setting device 8*a* (in the form of a switch) and the setting axle pin 8*x*. The setting axle pin 8*x* is fixedly connected to the support 4.

In FIG. 3*b* the setting device 8*a* is pivoted towards the right, as a result of which the damping device 7 is located in a maximum right-hand position relative to the support 4.

In FIG. 3*b* it can be seen that a first damping transmission element 5*a* is formed on the actuating arm 52. This first damping transmission element 5*a* is formed in the shape of an extension, which faces the damping device 7. In the position represented in FIG. 3*b*, the stop 55 is (still) spaced apart from the stop counterpiece 74 formed on the damper housing 71.

A stop element 56 (in the form of a roller) is arranged on the actuating arm device 5. This stop element 56 is (still) spaced apart from the second damping transmission element 5*b*, which is mounted on the support 4, pivotable via the axle pin 57.

FIGS. 4*a* to 7*b* in each case show a vertical longitudinal section through the mechanical actuating unit 1.1 in different positions.

Figure 4A:
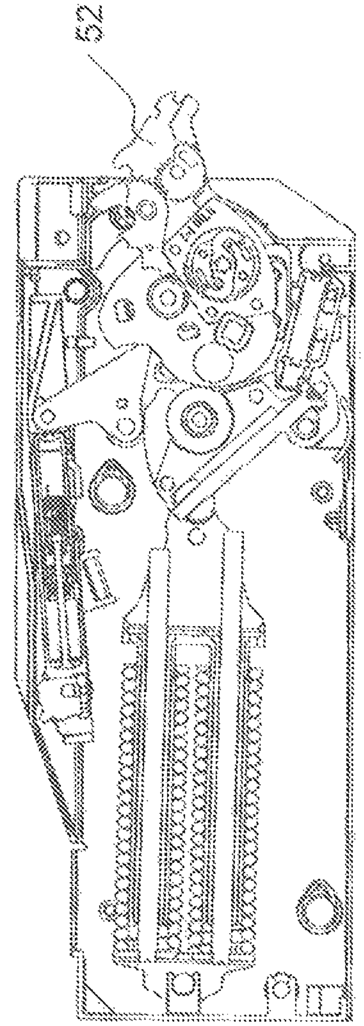
Figure 4B:
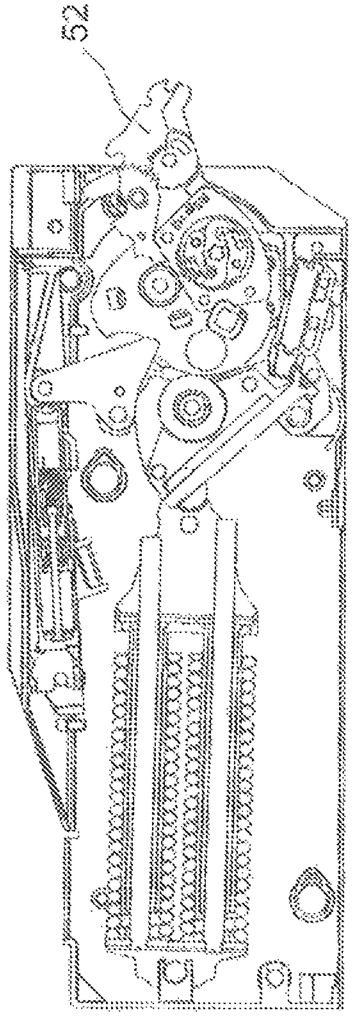

In FIGS. 4*a* and 4*b* the actuating arm device 5 is located in the same open position. This corresponds to an approximately half-open movable furniture part 2. The opening angle of the actuating arm 52 lies somewhere in the range between 55° and 80°.

However, FIGS. 4*a* and 4*b* differ in that the damping device 7 is located in different positions. In FIG. 4*b* the damping device 7 is located in its maximum right-hand position. As can be seen in the associated enlarged representation according to FIG. 5*b*, the setting device 8*a* is rotated towards the right about the setting axle pin 8*x*. As a result, a relatively broad region of the setting device 8*a* is located between the damper housing 71 and the setting axle pin 8*x*.

Figure 5A:
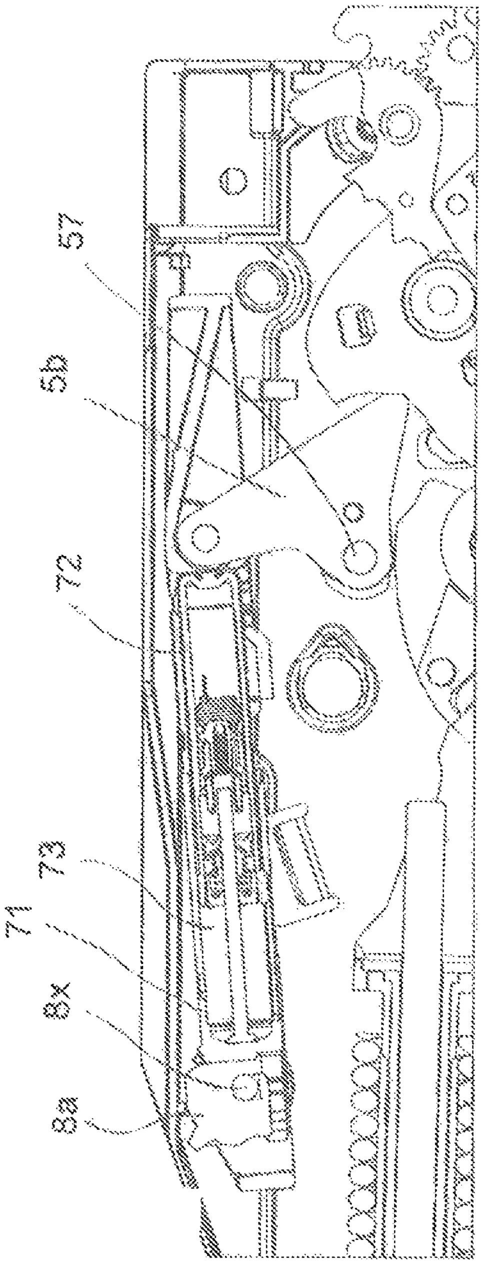

In contrast, in FIG. 4*a* and in the associated FIG. 5*a* the setting device 8*a* of the damper setting unit 8 is rotated 90° towards the left. As a result, a relatively narrow region of the setting device 8*a* is located between the damper housing 71 and the setting axle pin 8*x*. The damping device 7 is located in its maximum left-hand position.

In all positions according to FIGS. 4*a* to 5*b*, the damping device 7 is unloaded and thus pressure-relieved and in the fully extended position. The second damping transmission element 5*b* rests against the damping piston 72.

Figure 5B:
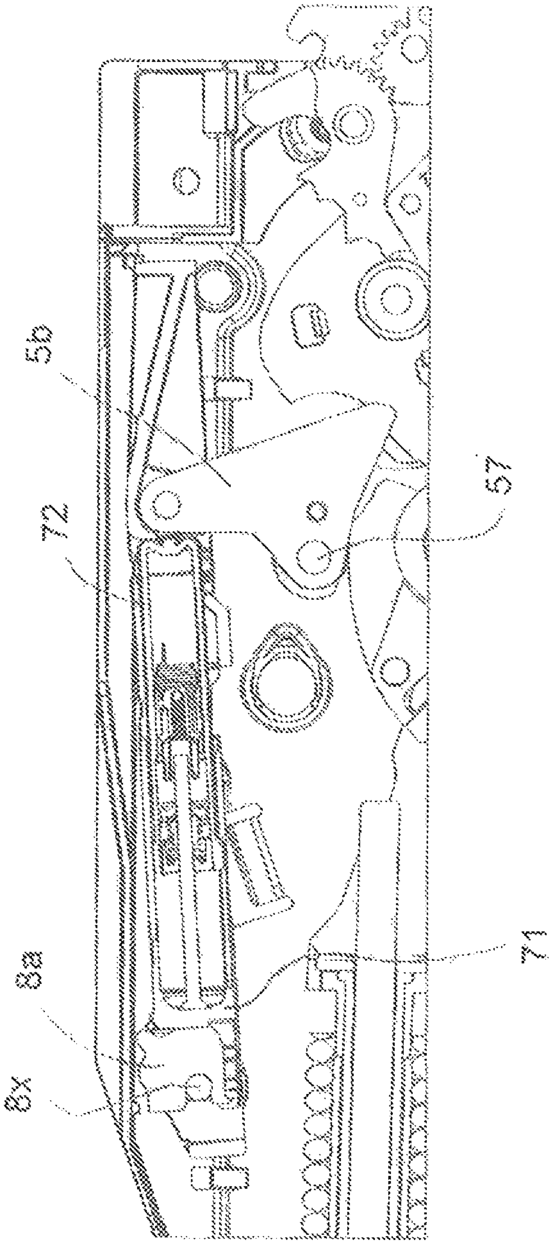

In the comparison between FIGS. 5*a* and 5*b* it can be recognized that, in addition to a translational displacement movement relative to the support 4, the damper housing 71 has also carried out a (slight) pivoting movement relative to the support 4.

Figure 6A:
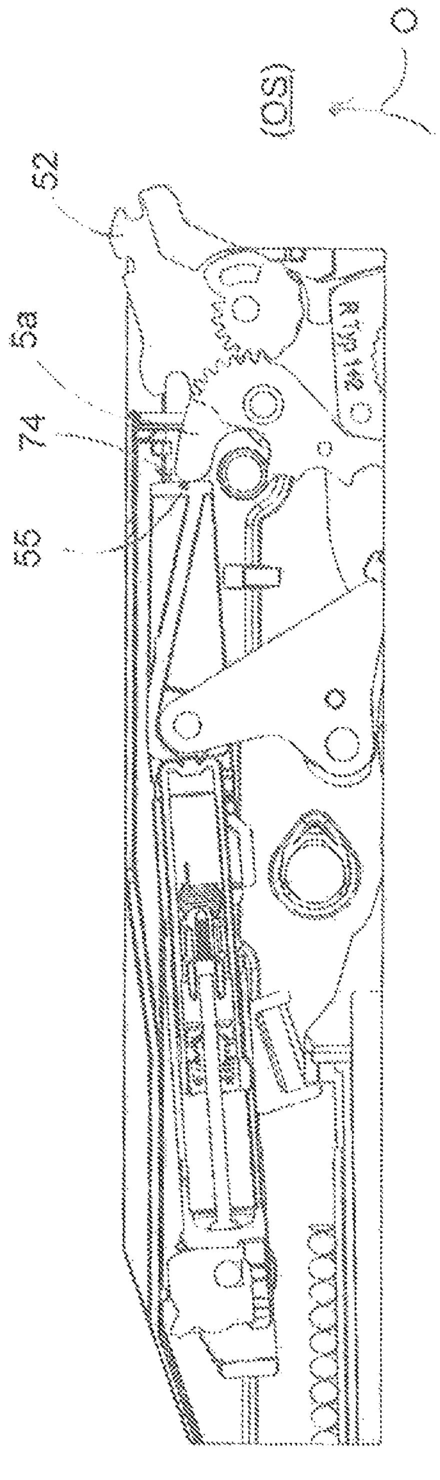
Figure 6B:
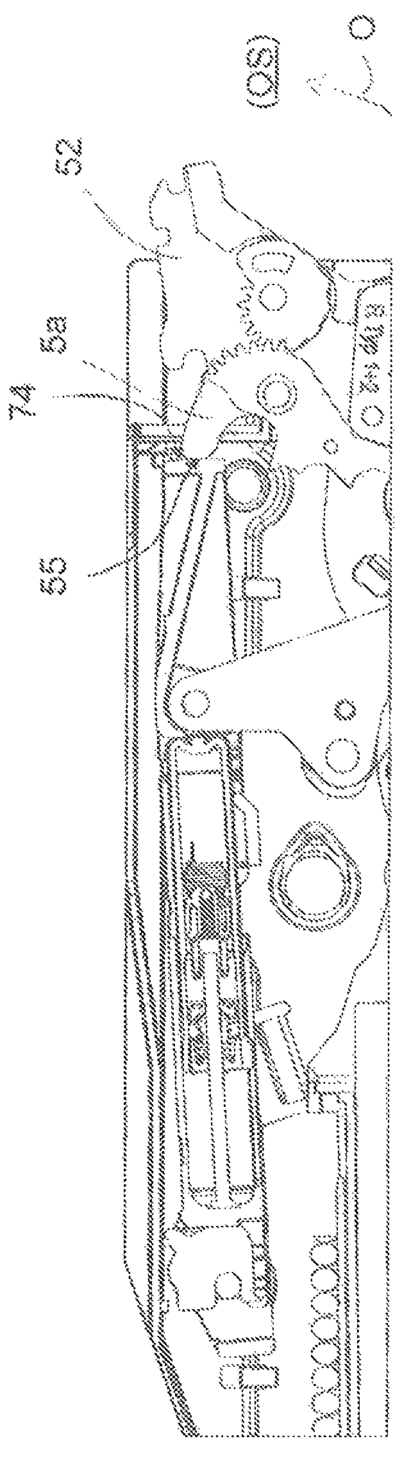

In FIGS. 6*a* and 6*b*—starting from the previous FIGS. 4*a* to 5*b*—an opening movement O of the actuating arm device 5 has been carried out. As a result, the actuating arm 52 has been pivoted upwards. This opening movement O was carried out until the stop 55 of the first damping transmission element 5*a* contacted the stop counterpiece 74. In this position, the damping starting position D is reached in each case.

As the damping devices 7 are located in different maximum positions in FIGS. 6*a* and 6*b*, the actuating arm 52 adopts a different angular position in the case of the respectively given damping starting position D. Specifically, there is an opening angle of approximately 108° in FIG. 6*a*, whereas there is an opening angle of 100° in FIG. 6*b*.

If the opening movement O is continued from this respective damping starting position D, the damper piston 72 is pushed into the damper housing 71 via the stop counterpiece 74, as a result of which the damping device 7 takes effect. As soon as the damper piston 72 is completely retracted, the maximum open position OS is reached (not represented).

The portion of movement of the movable furniture part 2 upstream of the maximum open position OS is thus damped, wherein the damping starting position D is set differently via the damper setting unit 8. As a result, different opening angles can be set for the start of the damping movement.

The same principle also applies to the closing movement S.

Figure 7A:
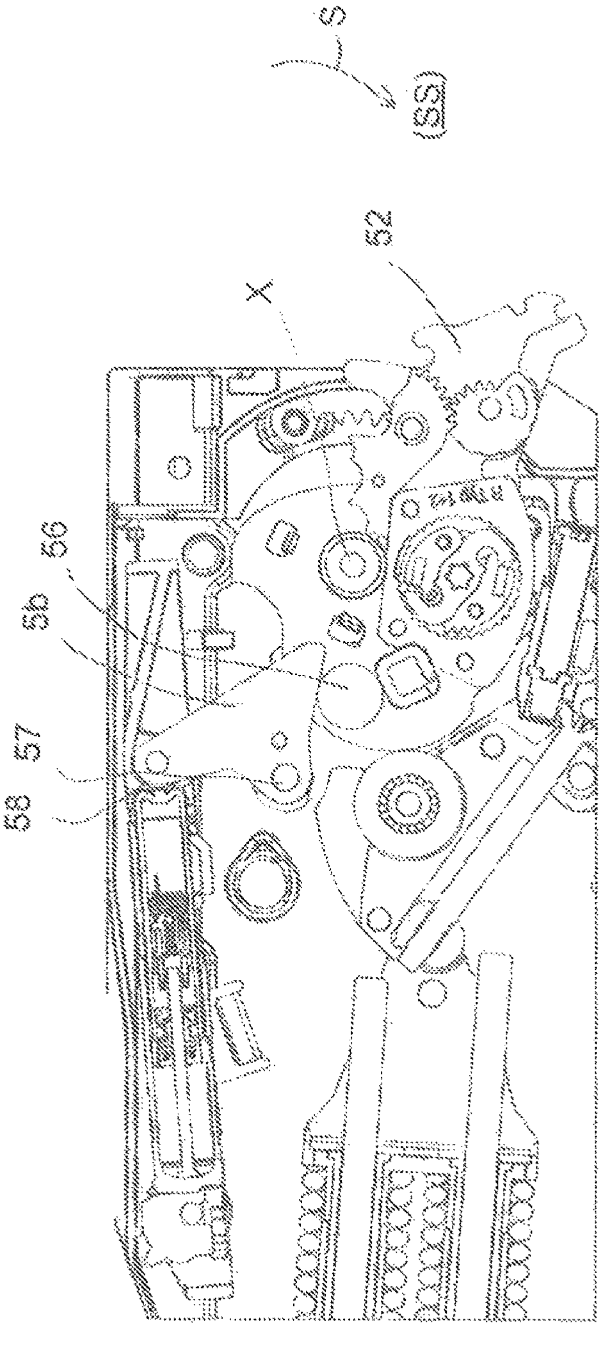
Figure 7B:
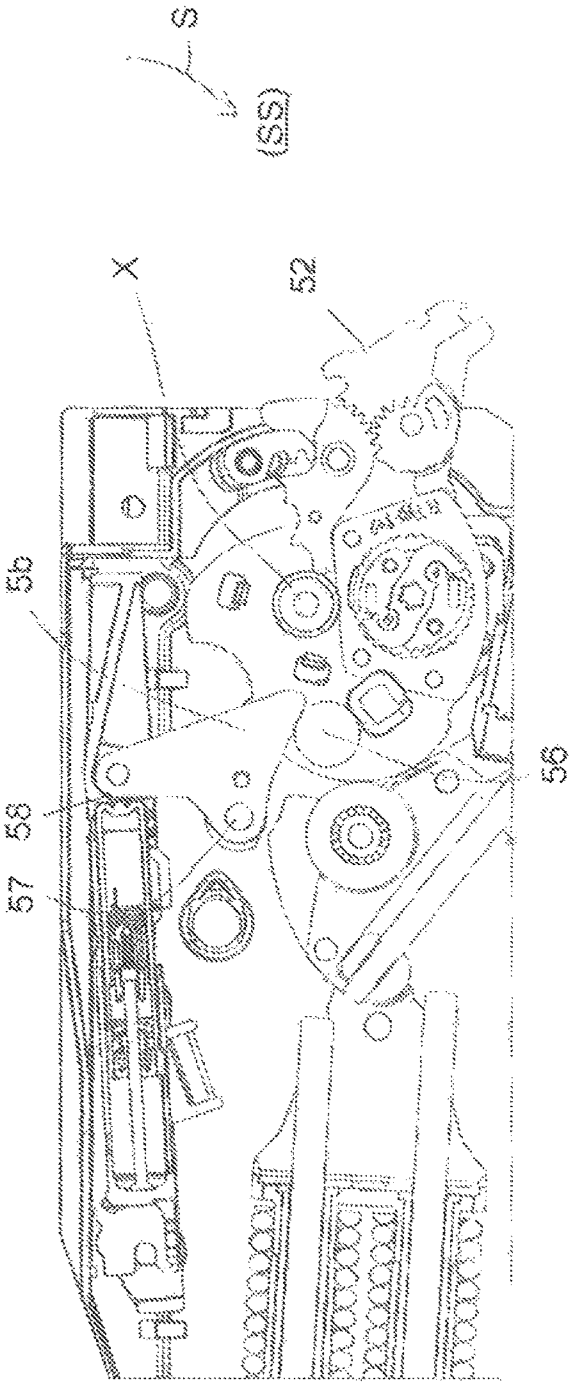

In FIGS. 7*a* and 7*b*—starting from FIGS. 4*a* to 5*b*—a closing movement S of the actuating arm device 5 has been carried out. As a result, the actuating arm 52 has been pivoted downwards. This closing movement S was carried out until the stop element 56 contacted the second damping transmission element 5*b* through the rotational movement of the actuating arm 52 about the pivot pin X. In this position, the damping starting position D is reached in each case.

As the damping devices 7 are located in different maximum positions in FIGS. 7*a* and 7*b*, the actuating arm 52 adopts a different angular position in the case of the respectively given damping starting position D. Specifically, there is an opening angle of approximately 22° in FIG. 7*a*, whereas there is an opening angle of just 33° in FIG. 7*b*.

If the closing movement S is continued from this respective damping starting position D, the second damping transmission element 5*b* is rotated counterclockwise about the axle pin 57 via the stop element 56, as a result of which the damping transmission element 5*b* presses on the damper piston 72 via the stop 58 and pushes it into the damper housing 71, as a result of which the damping device 7 again takes effect. As soon as the damper piston 72 is completely retracted, the closed position SS is reached (not represented).

Figure 8:
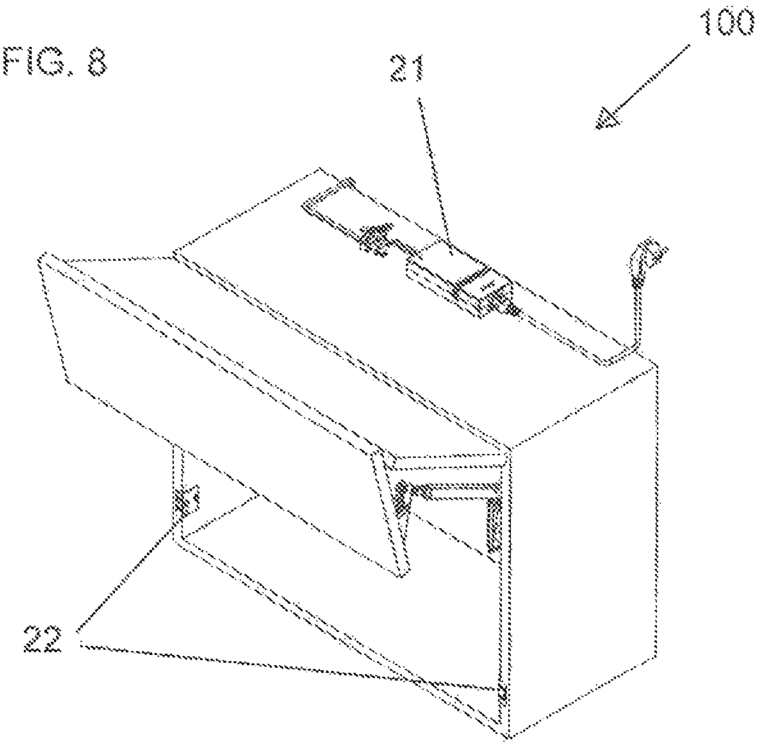
FIG. 8, is a perspective view of the piece of furniture with open bi-fold lift flap.

In FIG. 8, the entire piece of furniture 100 is represented in a perspective view. In this view, the power supply unit 21, via which an electric drive unit 1.2 (not recognizable here) can be supplied with power, can be recognized.

In FIG. 8, on both sides of the furniture carcass 3 there is also a detecting device 22 for detecting an overpressure movement and/or for triggering a closing movement S. If the movable furniture part 2 is located in the closed position SS and a user presses on the movable furniture part 2, this is detected by the detecting device 22, whereupon an opening movement O of the furniture drive system 1 is initiated via the control device 44 and the electric drive unit 1.2. In the case of a movable furniture part 2 that is open as in FIG. 8, a user can press directly on one of the detecting devices 22, whereupon a closing movement S of the furniture drive system 1 is initiated via the control device 44 and the electric drive unit 1.2.

Figure 9:
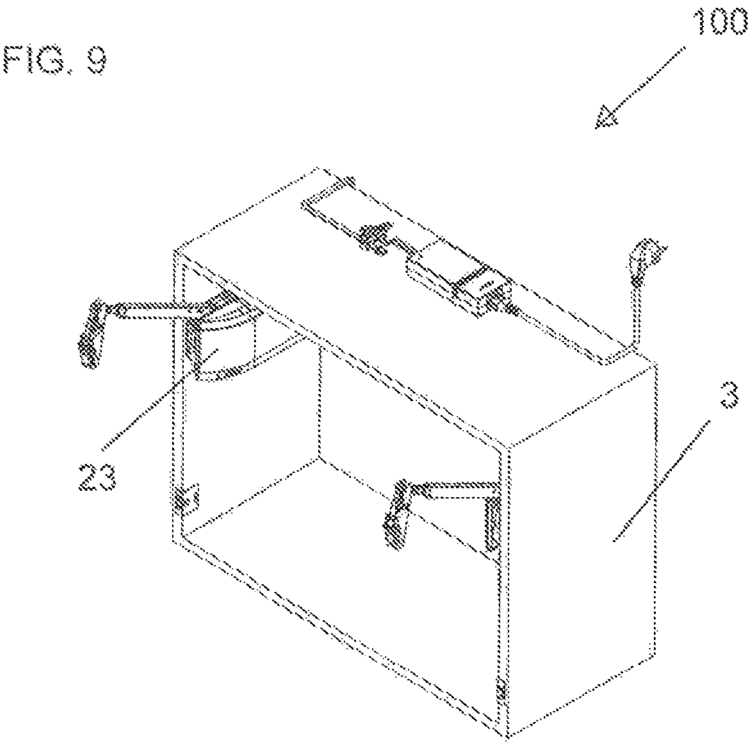
FIG. 9, is a perspective view of the furniture carcass with furniture drive systems arranged on both sides.

In FIG. 9, only the furniture carcass 3 together with the furniture drive systems 1 arranged on both sides of the furniture carcass 3 is represented in a perspective view. The protective faceplate 23 of the electric drive unit 1.2 can be easily recognized.

Figure 10:
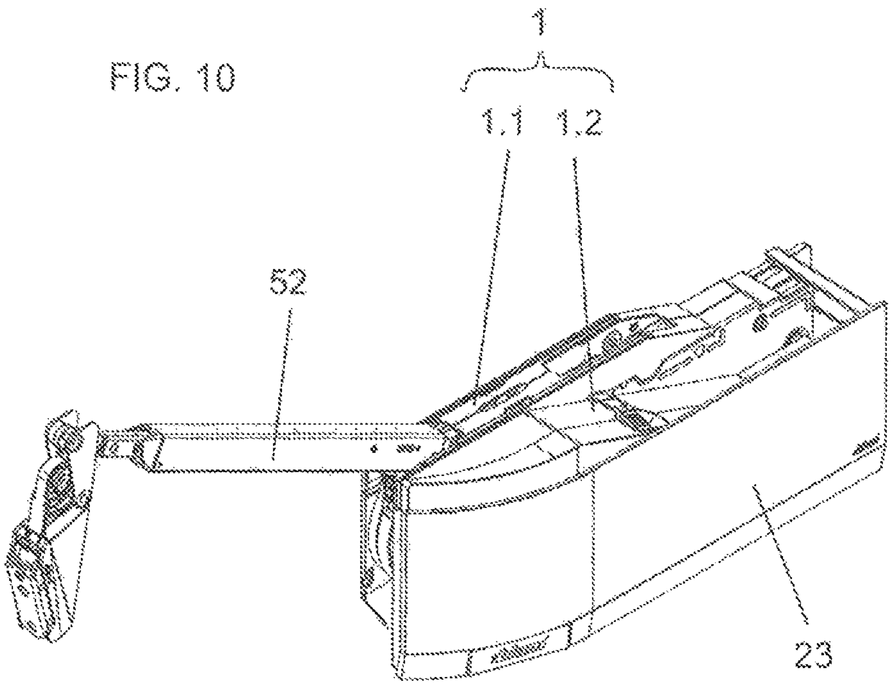
FIG. 10, is a perspective view of the furniture drive system with a protective faceplate.

FIG. 10 shows the furniture drive system 1, which contains the mechanical actuating unit 1.1 and the electric drive unit 1.2, in a perspective view. These two units 1.1 and 1.2 are releasably connected to each other laterally via their respective housing. The entire furniture drive system 1 can be fastened to a furniture carcass 3 via the support 4. The electric drive unit 1.2 has the protective faceplate 23.

Figure 11:
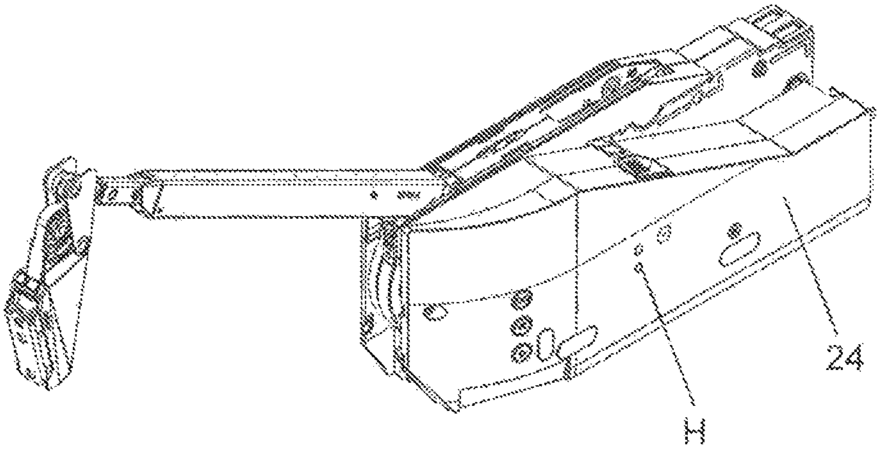
FIG. 11, is perspective view of the furniture drive system without protective faceplate, with a view onto the cover.

In FIG. 11, the furniture drive system 1 is again represented in perspective, wherein however the protective faceplate 23 has been omitted, as a result of which the view onto the cover 24 also forming the housing of the electric drive unit 1.2 is unobstructed. A visual indication signal H can be displayed on this cover 24 of the furniture drive system 1.

Figure 12:
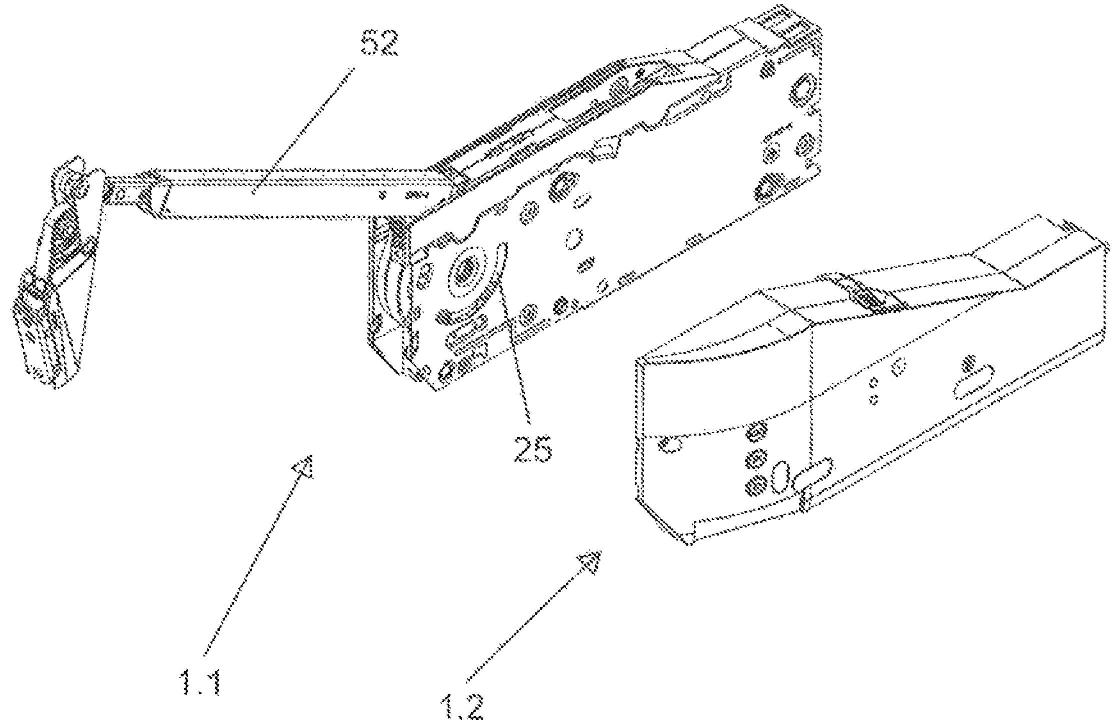
FIG. 12, is a perspective view of the mechanical actuating unit and the electric drive unit.

In FIG. 12, the electric drive unit 1.2 and the mechanical actuating unit 1.1 are represented separately. In the housing of the mechanical actuating unit 1.1, a (curved) engagement opening is formed, via which an engagement in the actuator 58 of the actuating arm device 5 is possible.

Figure 13:
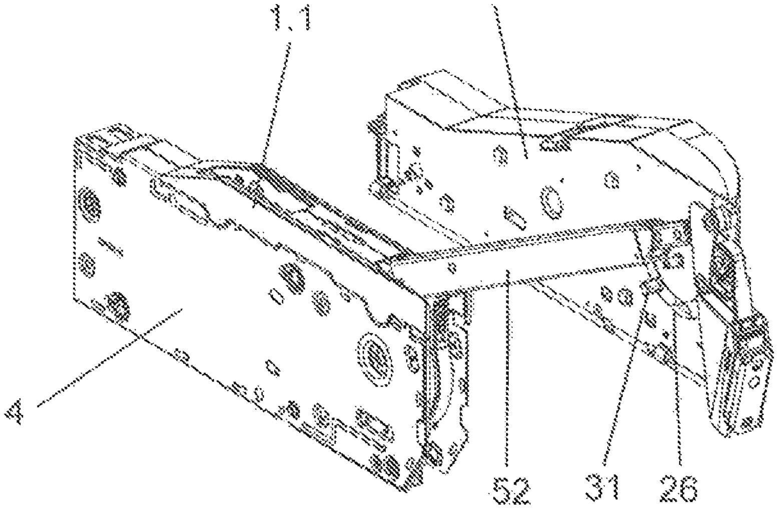
FIG. 13 shows a different perspective from FIG. 12, FIG. 14, is a perspective view of the electric drive unit.

In line with this, in FIG. 13, which shows a different angle of view onto the furniture drive system 1, the driver 31 protruding out of a (curved) exit opening 26 in the housing of the electric drive unit 1.2 can be seen.

Figure 14:
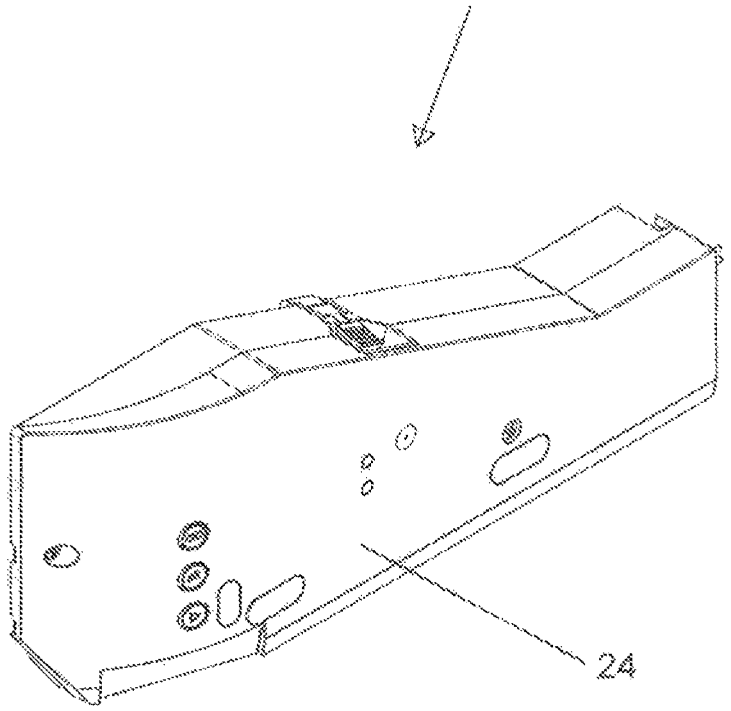

In FIG. 14, only the housing of the electric drive unit 1.2 together with the cover 24 is represented.

Figure 15:
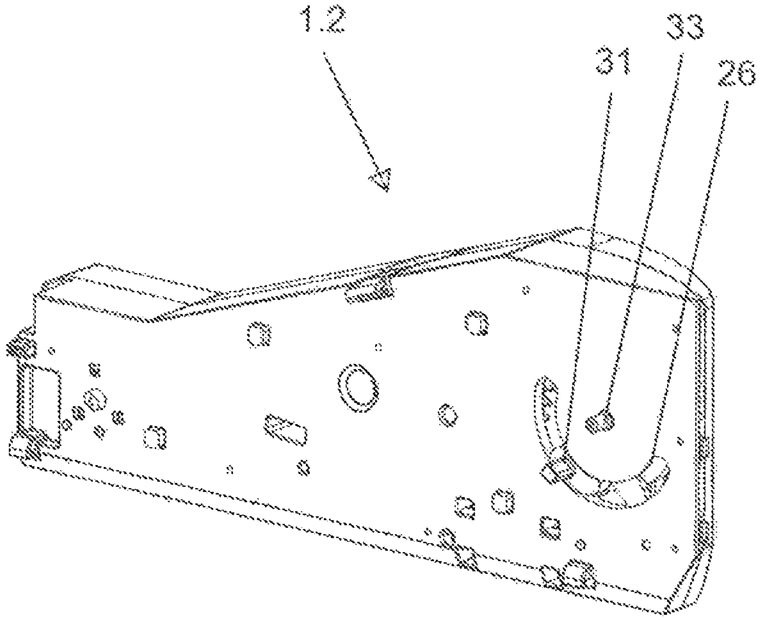
FIG. 15 shows a different perspective from FIG. 14, and FIG. 16, is a perspective view of details of the electric drive unit with all the relevant component parts.

FIG. 15 shows the electric drive unit 1.2 with a view onto the side facing the mechanical actuating unit 1.1. In the embodiment represented, the driver 31 is formed as a peg, which is mounted displaceable to a limited extent in a guide contour (exit opening 26), which is formed in the housing. The driver 31 projects from the housing on the side which faces the mechanical actuating unit 1.1.

Figure 16:
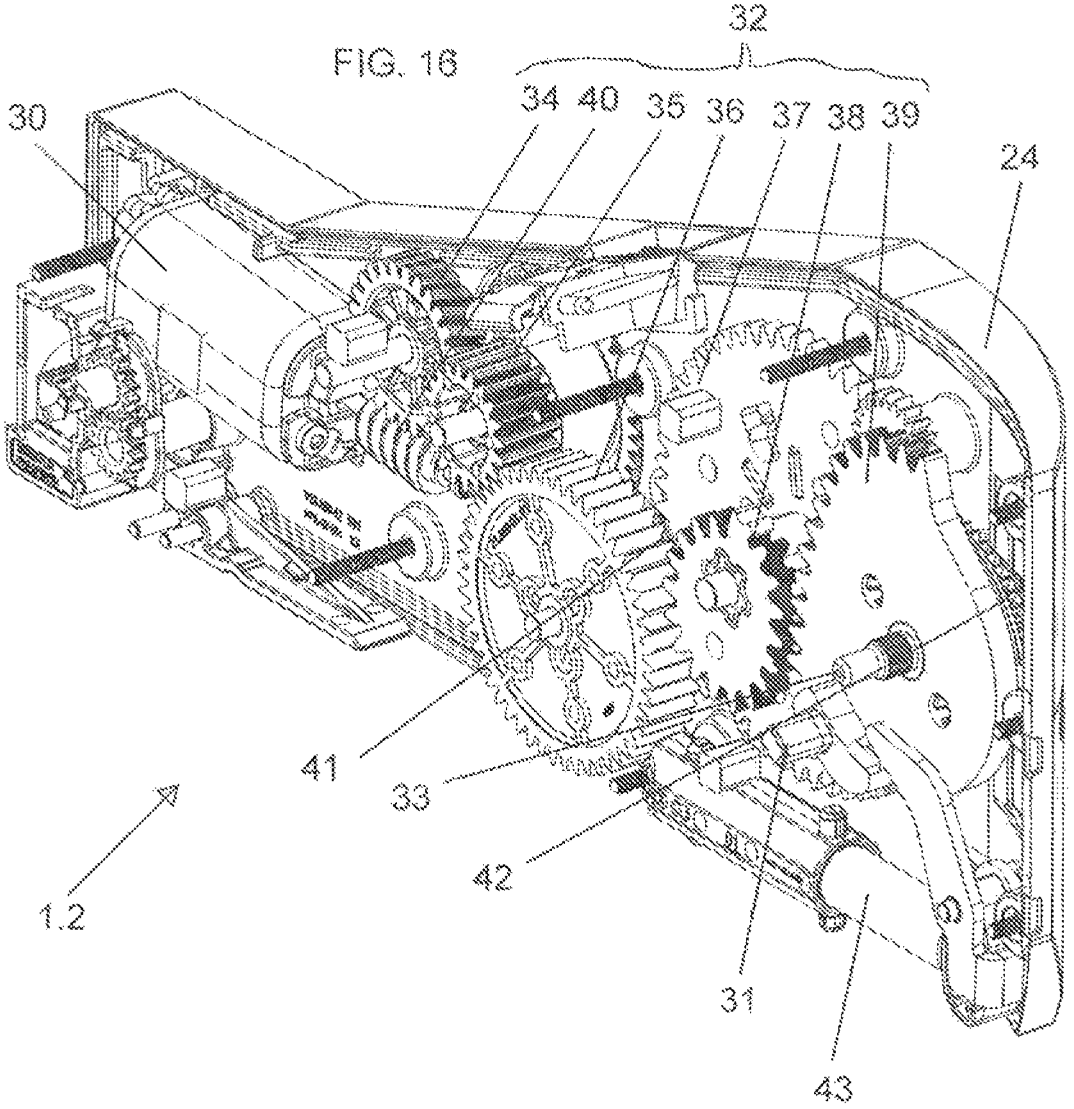

FIG. 16 shows the electric drive unit 1.2 of the furniture drive system 1 in a perspective detailed representation, wherein the part of the cover 24 pointing in the direction of the mechanical actuating unit 1.2 has been omitted.

The electric drive unit 1.2 comprises an electric motor 30 for the electric motor-powered support of the movement of the movable furniture part 2, which can be fastened to the actuating arm 52. Furthermore, the electric drive unit 1.2 comprises a driver 31, which can be driven (indirectly) by the electric motor 30, for transmitting a torque of the electric motor 30 to the mechanical actuating unit 1.2 or to the actuating arm 52 and a furniture part 2 that may possibly be connected to it.

The mechanical actuating unit 1.1 and the electric drive unit 1.2 can be connected to each other releasably. As a result, the electric drive unit 1.2 can be connected to the mechanical actuating unit 1.1 or separated from it in a simple manner.

The components of the electric drive unit 1.2 can be arranged in a housing comprising the cover 24, as represented. The housing rests against the mechanical actuating unit 1.2 at least in regions and, in the embodiment represented, separates the mechanical actuating unit 1.1 from the assembly of the electric drive unit 1.2.

In place of a housing, an installation plate which does not enclose the assembly of the electric drive unit 1.2 but delimits and supports it only on one side can also be used, for example.

Between the electric motor 30 and the driver 31, a gear mechanism 32 is provided, which converts a torque of the electric motor 30 into a pivoting movement of the driver 31 about a pivot pin 33.

The gear mechanism 32 comprises several gear stages (worm gear 40 and cogwheels 34, 35, 36, 37, 38 and 39). The gear stages 34 to 40 are in engagement with each other in each case via gear-tooth systems. Furthermore, the gear mechanism 32 comprises a freewheel clutch 41, which is integrated in the cogwheel 36, and an overload clutch 42, which is integrated in the cogwheel 39.

The electric drive unit 1.2 also has its own damping device 43 for damping the movement of the driver 31 about the pivot pin 33.

Returning to FIG. 1, the following may be described in more detail.

The control device 44 is also represented schematically in FIG. 1. This control device 44 can be formed separately from the furniture drive system 1. It is preferably provided that this control device 44 is integrated in the furniture drive system 1. This control device 44 is particularly preferably arranged on a printed circuit board also forming the electric drive unit 1.2.

The control device 44 has a determining device 45 for determining the force that can be exerted or is exerted on the actuating arm device 5 by the at least one drive device A.

The determining device 45 has a sensor 46 for measuring the power consumption of the electric motor 30. The sensor 46 can also be arranged on the printed circuit board and is in signaling connection with the electric motor 30. The measured power consumption value E of the electric motor 30 is compared with a reference value $V_E$—preferably determined in a reference movement. In the case of a deviation (e.g. by a particular threshold value $T_E$), a deviation signal W is emitted.

The determining device additionally (or alternatively) has an angle sensor 47 for measuring the angular position of the actuating arm device 5. The angle sensor 46 can also be arranged on the printed circuit board and detects the angular position of the actuating arm 52 of the actuating arm device 5 at different points in time. The speed G of the actuating arm 52 determined therefrom is compared with a reference value $V_G$—preferably determined in a reference movement. In the case of a deviation (e.g. by a particular threshold value $T_G$), a deviation signal W is emitted.

LIST OF REFERENCE NUMBERS

1 furniture drive system
1.1 mechanical actuating unit
1.2 electric drive unit
2 movable furniture part
**2*a*** first furniture flap
**2*b*** second furniture flap
3 furniture carcass
**3*a*** side wall
4 support
5 actuating arm device
**5*a*** first damping transmission element
**5*b*** second damping transmission element
51 transmission mechanism
52 actuating arm
53 control cam
54 pressure roller
55 stop
56 stop element
57 axle pin
58 actuator
59 transmission opening
6 energy storage mechanism
7 damping device
71 damper housing
72 damper piston
73 damping device
74 stop counterpiece
8 damper setting unit
**8*a*** setting device
**8*x*** setting axle pin
**8*b*, 8*c*** indentations
**9*a*** hinges
**9*b*** hinges
10 ceiling
11 actuating arm extension
**11*a*** first actuating arm part
**11*b*** second actuating arm part
12 fastening device
14 energy storage mechanism setting unit
**14*a*** setting wheel
15 point of application
16 threaded spindle
**17*a*** opening
19 intermediate lever
**19*a*** pivot pin
20 installation safety device
**20*a*** centrifugal clutch
21 power supply unit
22 detecting device
23 protective faceplate
24 cover
25 engagement opening
26 exit opening
30 electric motor
31 driver
32 gear mechanism
33 pivot pin
34 cogwheel (gear stage)
35 cogwheel (gear stage)
36 cogwheel (gear stage)
37 cogwheel (gear stage)
38 cogwheel (gear stage)
39 cogwheel (gear stage)
40 worm gear (gear stage)
41 freewheel clutch
42 overload clutch
43 damping device
44 control device
45 determining device
46 sensor for measuring the power consumption
47 angle sensor
100 piece of furniture
A drive device
D damping starting position
S closing movement
O opening movement
SS closed position
OS maximum open position
X pivot pin
H indication signal E power consumption value $V_E$ reference value (power consumption)

$V_G$ reference value (speed)

$T_E$ threshold value (power consumption)

$T_G$ threshold value (speed)

W deviation signal

G speed

The invention claimed is:

1. A furniture drive system for a movable furniture part, comprising:

a support configured to fit the furniture drive system on a furniture carcass, an actuating arm device movably mounted on the support and configured to be connected to the movable furniture part, an electric motor connected to the actuating arm device and configured to move the actuating arm device, a drive device separate from the electric motor and configured to exert a force on the actuating arm device, a setting device configured to set the force to be exerted on the actuating arm device by the drive device, and a control device configured to control the electric motor, wherein the control device has a determining device for determining the force to be exerted on the actuating arm device by the drive device, wherein the drive device has a damping device configured to damp at least one of a closing movement and an opening movement of the actuating arm device, and wherein the determining device is configured to carry out a damper check of the damping device, the damper check comprising obtaining a reference movement of the actuating arm device, the reference movement including a parameter determined and compared with a reference value or a reference value progression.

2. The furniture drive system according to claim 1, wherein the drive device includes an energy storage mechanism, the energy storage mechanism having a first end engaging the support and having a second end engaging the actuating arm device.

3. The furniture drive system according to claim 2, wherein the energy storage mechanism comprises a spring assembly, and the second end of the energy storage mechanism indirectly engages the actuating arm device.

4. The furniture drive system according to claim 1, wherein the determining device includes a sensor configured to measure a power consumption of the electric motor.

5. The furniture drive system according to claim 4, wherein the control device is configured to compare a value of the power consumption of the electric motor measured with a reference value or reference value progression of the power consumption, and is further configured to emit a deviation signal if a deviation of the measured power consumption from the reference value or from the reference value progression is determined.

6. The furniture drive system according to claim 5, wherein the control device is configured to display a visual indication signal on the furniture drive system depending on the emitted deviation signal.

7. The furniture drive system according to claim 6, wherein the control device is configured to display the visual indication signal on a cover of the furniture drive system.

8. The furniture drive system according to claim 5, wherein the drive device includes an energy storage mechanism and the setting device includes an energy storage mechanism setting unit configured to, when the deviation signal is emitted, set a force from the energy storage mechanism acting on the actuating arm device.

9. The furniture drive system according to claim 5, wherein the control device is configured to determine the reference value or the reference value progression of the power consumption in the reference movement, and is further configured to emit the deviation signal if the deviation of the measured power consumption from the reference value or from the reference value progression lies above a defined threshold value.

10. The furniture drive system according to claim 1, wherein the determining device includes an angle sensor configured to measure an angular position of the actuating arm device.

11. The furniture drive system according to claim 10, wherein the control device, is configured to determine a speed of the actuating arm device in a movement portion in at least one of a position directly before the closed position when the actuating arm device is moving in a closing direction and a position directly before the open position when the actuating arm device is moving in an opening direction based on the angular position measured by the angle sensor at different points in time.

12. The furniture drive system according to claim 11, wherein the control device is configured to compare the speed determined via the angle sensor with a reference value or reference value progression of the speed, and is further configured to emit a deviation signal if a deviation of the measured speed from the reference value or from the reference value progression is determined.

13. The furniture drive system according to claim 12, wherein the control device is configured to display a visual indication signal on the furniture drive system depending on the emitted deviation signal.

14. The furniture drive system according to claim 13, wherein the control device is configured to display the visual indication signal on a cover of the furniture drive system.

15. The furniture drive system according to claim 12, wherein the setting device includes a damper setting unit configured to, when the deviation signal is emitted, set at least one of the damping force and a damping starting position in relation to an angular position of the actuating arm device relative to at least one of the support and a damping path.

16. The furniture drive system according to claim 12, wherein the control device is configured to compare the speed determined via the angle sensor with a reference value or reference value progression of the speed determined in the reference movement, and is further configured to emit the deviation signal if the deviation of the measured speed from the reference value or from the reference value progression lies above a defined threshold value.

17. The furniture drive system according to claim 1, wherein the actuating arm device and the drive device are part of a mechanical actuating unit, and the electric motor is part of an electric drive unit implemented as an assembly formed separately from the mechanical actuating unit and having a driver, the driver being configured to be driven by the electric motor to transmit a torque of the electric motor to the actuating arm device of the mechanical actuating unit.

18. The furniture drive system according to claim 17, wherein the electric drive unit includes a gear mechanism between the electric motor and the driver.

19. The furniture drive system according to claim 18, wherein the gear mechanism comprises at least two gear stages and at least one of a freewheel clutch and an overload clutch.

20. The furniture drive system according to claim 1, wherein the drive device includes an energy storage mechanism configured to exert the force on the actuating arm device, the furniture drive system further comprising a transmission mechanism configured to transmit the force of the energy storage mechanism to the actuating arm device.

21. The furniture drive system according to claim 20, wherein the transmission mechanism includes a control cam and a pressure roller loaded by the energy storage mechanism, the pressure roller being configured to move along the control cam during a movement of the actuating arm device.

22. The furniture drive system according to claim 20, wherein the actuating arm device includes a movably mounted actuator configured to assist in the transmission of a force from the energy storage mechanism to the actuating arm device.

23. The furniture drive system according to claim 22, wherein the movably mounted actuator has a transmission opening to allow engagement with a driver driven by the electric motor.

24. The furniture drive system according to claim 1, wherein the drive device includes an energy storage mechanism configured to perform at least one of:

compensate for a weight force of the actuating arm device and of the furniture part to be connected to the actuating arm device, move the actuating arm device in a direction of a fully closed position, and move the actuating arm device in a direction of a fully open position.

25. A piece of furniture comprising:

a furniture carcass, a furniture part movable relative to the furniture carcass, and the furniture drive system according to claim 1.

26. The piece of furniture according to claim 25, wherein the furniture part is mounted to be movable about a horizontal axis, and the furniture part is one of a bi-fold lift flap, a lift up flap, or an up and over lift flap.

27. The furniture drive system according to claim 1, wherein the actuating arm device is rotatably mounted on the support.

28. A method for operating a furniture drive system, the furniture drive system includes:

a support configured to fit the furniture drive system on a furniture carcass, an actuating arm device movably mounted on the support and configured to be connected to the movable furniture part, an electric motor connected to the actuating arm device and configured to move the actuating arm device, a drive device separate from the electric motor and configured to exert a force on the actuating arm device, a damping device configured to damp at least one of a closing movement and an opening movement of the actuating arm device, a setting device configured to set the force to be exerted on the actuating arm device by the drive device, and a control device configured to control the electric motor, the method comprising:

determining the force to be exerted on the actuating arm device by the drive device using a determining device of the control device, the determining device being configured to carry out a damper check of the damping device, the damper check comprising obtaining a reference movement of the actuating arm device, the reference movement including a parameter determined and compared with a reference value or a reference value progression.

29. The method according to claim 28, further comprising:

measuring a power consumption of the electric motor via a sensor, comparing the measured power consumption with a reference value or reference value progression, and emitting a deviation signal if a deviation of the measured power consumption from the reference value or from the reference value progression is detected.

30. The method according to claim 29, further comprising setting or adjusting the force from an energy storage mechanism of the drive device acting on the actuating arm device via an energy storage mechanism setting unit of the setting device when the deviation signal is emitted.

31. The method according to claim 29, wherein the comparing of the measured power consumption with the reference value or reference value progression is determined in the reference movement, and the emitting of the deviation signal is perform if the deviation of the measured power consumption from the reference value or from the reference value progression lies above a defined threshold value.

32. The method according to claim 28, further comprising:

determining a speed of the actuating arm device in a movement portion in at least one of a position directly before a closed position when the actuating arm device is moving in a closing direction and directly before an open position when the actuating arm device is moving in an opening direction based on values measured by an angle sensor at different points in time, comparing the speed determined via the angle sensor with a reference value or reference value progression, and emitting a deviation signal if a deviation of the measured speed from the reference value or from the reference value progression is determined.

33. The method according to claim 32, further comprising setting or adjusting at least one of:

a damping force, a damping starting position in relation to an angular position of the actuating arm device relative to the support, and a damping path of a damping device of the drive device via a damper setting unit of the setting device when a deviation signal is emitted.

34. The method according to claim 32, wherein the speed determined via the angle sensor is compared with a reference value or reference value progression determined in a reference movement, and wherein the deviation signal is emitted when the deviation of the measured speed from the reference value or from the reference value progression lies above a defined threshold value.

* * * * *